3,505,279
POLYOLEFIN-ORGANOSILANE
GRAFT POLYMERS
Jerome A. Preston and Carlton J. Davis, Sr., Newark, Ohio, assignors to Owens-Corning Fiberglas Corporation, a corporation of Delaware
No Drawing. Filed Oct. 27, 1966, Ser. No. 589,791
Int. Cl. C08f 45/04; C08g 47/10; C03c 25/02
U.S. Cl. 260—41           10 Claims

ABSTRACT OF THE DISCLOSURE

A polyolefin-organosilane graft polymer wherein an organosiloxane is attached to both ends of an intermediate molecular weight polyolefin and this material is incorporated in other polyolefin to achieve a bond between siliceous fibers. The resulting composite has increased strength over similar polyolefin composite which do not include the graft polymer.

---

The present invention relates to polyolefin-organosilane graft copolymers, and a method of making the same; and more particularly to bonding agents and molding compounds wherein surfaces, and particularly glass surfaces, are bonded together by the graft copolymer.

An object of the present invention is the provision of a new and improved material for coupling resins, both thermosetting and thermoplastic, to solid surfaces having OH groups thereon, as for example, glass fibers.

Another object of the invention is the provision of a new and improved thermoplastic resin having improved strength.

Another object of the invention is the provision of a new and improved method of producing polyolefin-organosilane graft copolymers.

A still further object of the invention is the provision of a new and improved thermoplastic-glass composite wherein the thermoplastic resin is more tightly bonded to the surface of the glass than was possible heretofore.

A still further object of the invention is the provision of a new and improved molding compound and the like comprising glass fibers dispersed throughout a thermoplastic resin that includes an organosilane-organo resin copolymer dispersed throughout the thermoplastic resin and bonding the glass fibers together.

Further objects and advantages of the invention will become apparent to those skilled in the art to which the invention relates from the following description of several preferred embodiments of the graft copolymers, a method of producing the same and molding materials etc. made therefrom.

As previously indicated, the present invention relates to a method and means for increasing the strength of a thermoplastic resin, and also to a means for improving its attachment to surfaces having oxygen atoms thereon, and particularly hydroxyl groups. Because the materials of the present invention both increase the strength of the thermoplastic resin and the strength of attachment to glass surfaces, it is uniquely suited for glass fiber filled thermoplastic materials suitable for use as molding compounds and the like. The strength producing copolymer of the present invention comprises a backbone portion of a thermoplastic material and organosilanes coupled to each end of the backbone polymer. Particularly useful materials are formed from polyolefins having a molecular weight of from approximately 500 to approximately 50,000, and each molecule of which has terminal unsaturate groups at its opposite ends. This material is reacted with an organosilane, the organo portion of which has a functional group reactive with the unsaturate group of the backbone polymer. Any suitable functional group can be used as for example, an alpha-beta unsaturate, an oxirane group, an imine group, an amine group etc.

The polymer or reaction product of the present invention can be used by itself as a coupling agent, but is preferably used as an admixture with other thermoplastic resins. When used as an admixture, it is completely compatible with the thermoplastic resin, because the backbone of the polymer of the present invention is also a thermoplastic resin. When glass fibers are mixed with the admixture, the polymer can bridge the space between the glass fibers with opposite ends thereof attached to adjacent glass fibers. This is evident by the large increase in strength of the polymer when only a small percentage of the polymer is included in the admixture. In the most preferred admixtures, glass fibers coated with an organosilane monomer is admixed with a mixture of a polyolefin and the organosilane-polyolefin reaction product of the present invention. The coupling agent on the glass assures a direct coupling with the silane portion of the thermoplastic-organosilane polymer, so that tension is transferred from one glass fiber to another glass fiber by chemical bonds. In general, the admixture of the thermoplastic and thermoplastic-organosilane reaction product or polymer will show a definite increase in strength when more than approximately 1 percent of the thermoplastic-organosilane reaction product is included, and a continuing increase in strength is had as the amount of the reaction product is increased to approximately 6 percent.

A problem exists in providing organosilane groups at the opposite ends of a backbone thermoplastic molecule. Polymeric materials are much more unreactive than monomeric materials because polymeric materials comprise large unyieldy molecules. Therefore, strongly reactive materials and/or quite extreme conditions must be used in order to obtain organosilane or siloxane radicals at both ends of the molecule. Such reactive conditions tend to cause polymerization of the organosilane molecules rather than a coupling to the end of the backbone polymer. In addition, these highly reactive conditions will produce some, and in some instances, a considerable amount of further polymerization of the backbone polymer.

The method of the present invention for producing the polymeric reaction product of the present invention comprises heating a thermoplastic material, preferably a polyolefin having a molecular weight of from approximately 500 to approximately 50,000, to a temperature above 240° F., preferably above 350° F., but below a temperature at which decomposition takes place. Polyolefins having a molecular weight of less than 1500 can be used, but produce a tacky copolymer. For polyolefins, this temperature is most preferably in the range of from 350 to 400° F. In a separate vessel, a free radical catalyst is mixed with an organosilane and an organic solvent at room temperature. The organosilane may be of any type in which the organo portion has a functional group reactive with the unsaturate radical of the polyolefin. A preferred material is an amino silane, as for example gamma aminopropyltrialkoxy silane. The free radical catalyst will preferably be present in the second mixture in an amount more than approximately ½ percent, and preferably more than 1 percent. No appreciable advantage appears to be had by using more than approximately 5 percent of the free radical catalyst. After the free radical catalyst and the organosilane are thoroughly mixed and dissolved in an organic solvent, the second mixture while at room temperature is slowly blended into the hot solution of the resin. Because the free radical catalyst is incorporated with the organosilane, and not the resin, substantially no reaction or polymerization of the thermoplastic resin takes place prior to addition of the organosilane. Because the free radical catalyst is intimately mixed with the organosilane, an organo portion of the silane will be adjacent a free radical of the catalyst when the catalyst is heated by the hot resin solution. The free radicals are only produced when the catalyst is heated and by slowly blending the second solution into the first, the functional group of the organosilane will be adjacent a free radical at the time the free radical is formed. In turn this free radical is formed only when adjacent a molecule of the thermoplastic resin, because such contact is necessary to produce the free radical in the first instance. There is then, an immediate link up of the organosilane molecule and an end of a thermoplastic resin molecule. Because the reaction is carried out in a slow continuous mixing procedure, the product of the reaction is carried away, and new unreacted ends of the thermoplastic are brought into contact with the organosilane monomer. A high percentage, therefore, of the organosilane molecules are connected to the ends of the thermoplastic resin molecules without further polymerization of the thermoplastic resin, or a production of a diamine. As previously indicated, the thermoplastic resin is not further polymerized because it does not contain the catalyst. While free radical catalysts can cause amines to polymerize to diamines, this reaction does not take place even though the catalyst is present, because it does not have the necessary temperature. The reaction of the amine with the olefin radical of the polymer stops the reaction and kills the catalyst at that point. The process described, therefore, achieves the desired result, even though many competing reactions exist.

Obviously, it is impossible, and unnecessary, with the above explanation to give examples of all of the operable combinations and embodiments of the materials of the present invention, and the following examples are given as illustrative of the principles of the present invention. Still other embodiments utilizing those principles will readily occur to those skilled in the art.

EXAMPLE 1

800 parts of "Microthene" polyethylene having a molecular weight of approximately 10,000, and 4,000 parts of xylene are added to a stainless steel vessel. The contents of the vessel are heated to a temperature of between 350 to 400° F. and are stirred until the "Microthene" polyethylene is thoroughly dissolved. In another stainless steel vessel, 5.0 parts by weight of tertiarybutyl peroxide are added to 200 parts by weight of gamma aminopropyltriethoxysilane, both at room temperature, and the mixture is thoroughly stirred. The mixture of tertiarybutyl peroxide and the gamma aminopropyltriethoxysilane is then slowly added to the contents of the first vessel while those contents are at a temperature of 350 to 400° F., and while the contents of the second vessel are at room temperature. The contents of the second vessel are slowly blended into the contents of the first vessel and a thickening of the mixture is immediately discernible. After the materials are blended together, the thickened mixture is poured into cooling pans and allowed to set for 24 hours at 70° F. The resultant mass is then transferred to an aluminum pan and dried for seven hours at a temperature of 235° F. to remove substantially all of the xylene solvent, and alkylene amines formed during the reaction. The material is then ground in a hammer mill until all of the material passes through an 18 mesh U.S. Sieve Series screen.

Five grams of the grafted polymer produced as above described is added to 95 parts of xylene in a stainless steel vessel, and the mixture is heated to 240° F. with stirring until the polymer is dissolved. This solution is then applied to glass fibers at forming using a standard graphite roll type applicator, which roll is wetted with the solution, and over which roll, the glass fibers are drawn. The solution in the applicator is kept heated to a temperature of 180° F. This procedure applies approximately one half percent based on the weight of the coated fiber of the polymer to the glass fibers. The coated glass fibers are brought together into a 204 monofilament strand which is wound into a package. The strands from 20 such packages are brought together into a roving, and this roving is chopped into approximately ¼ inch length.

Twenty grams of these short chopped fibers are then placed in a drum tumbler with 80 grams of a reactor flake polyethylene having a molecular weight of approximately 200,000 and the materials are thoroughly mixed. The mixture is then placed in a one inch National Rubber Machine screw extruder which is electrically heated to 500° F., and the mixture is extruded into a one quarter inch diameter cylindrical rod which is then fed into a Cumberland pelletizer to form one quarter inch long pellets. The pellets are fed to an injection molding machine heated to 500° F., and the material is extruded into a standard ASTM D-638 dog bone specimen, which when cooled to room temperature and tested in a standard tensile testing machine, broke at 7,500 pounds per square inch.

By way of a control or comparison, and not according to the invention, a water emulsion containing 7 percent polyvinyl acetate solids was mixed with ½ percent gamma aminopropyltriethoxysilane to form a size. This size was placed on glass fibers in the same manner previously described. Twenty strands were brought together into a roving which were chopped into quarter inch lengths as above described. These chopped fibers were combined with "Microthene" polyethylene powder using the same ratios and method above described. Pellets of this mixture were then made and extruded at 500° F. into a test specimen as above described and the test specimen had a strength of 5,000 pounds per square inch.

EXAMPLE 2

The procedure of Example 1 was repeated excepting that a polypropylene resin having a molecular weight of 2,000 was substituted for the polyethylene of Example 1, and excepting that 4 parts by weight of dicumyl peroxide were substituted for the 5 parts of the tertiarybutyl peroxide of Example 1. The polypropylene-gamma aminotriethoxysilane polymer was dissolved in xylene using the same proportions of polymer to xylene given in Example 1, but was dissolved at a temperature of 280° F. and was applied to glass fibers in the same manner given in Example 1.

These glass fibers were made into a roving and chopped into quarter inch lengths as in the same manner described in Example 1. Twenty parts of these fibers were tumbled with 80 parts of an isotactic polypropylene having a melt index of 5.5 and a molecular weight of approximately 200,000. This mixture was extruded, pelletized, and injected molded into a test specimen in the same manner given in Example 1, and the test specimen had a tensile strength of 7,780 p.s.i. A test specimen of the isotactic polypropylene resin alone without glass reinforcing was 4,400 p.s.i. Glass fibers sized with polyvinyl acetate as described in Example 1 when mixed with the isotactic polypropylene in the same manner given above and extruded into a test specimen had a tensile strength of 5,500 p.s.i. The polymeric reaction product by itself has only a strength of 480 p.s.i.

EXAMPLE 3

The procedure of Example 2 was repeated excepting that gamma chloropropyltrimethoxy silane was substituted for the gamma aminotriethoxy silane of Example 2. This material was coated on glass fibers, the fibers chopped into ¼ inch lengths, and chopped fibers mixed with the isotactic polypropylene, all in accordance with Example 2, produced test specimens having a tensile strength of 6,980 p.s.i.

EXAMPLE 4

Twenty parts of glass fibers coated with polyvinyl acetate and an organosilane monomer as described for the control of Example 1 are mixed with 5 parts of the polypropylene-organosilane polymer of Example 2, along with 75 parts of the isotactic polypropylene of Example 2. This material extruded into test specimens in the same manner given in Example 1 had a tensile strength of 12,750 p.s.i.

As noted in Example 2, control glass fibers coated with the polyvinyl acetate and the silane monomer when mixed with the isotactic polypropylene in the same ratio has a strength of only 5,500 pounds per square inch. This example, therefore, shows the advantage of incorporating the polymers of the present invention in the impregnating or molding plastic.

The polymers of the present invention and including those above described can be applied to the fibers either as an organic solution or as a hot melt. In addition, rovings of glass fibers which are devoid of film formers can be drawn through a hot solvent solution of the polymers to coat the roving rather than the individual filaments. In addition, bare glass fibers can be mixed with the dry polymer and extruded at a temperature above the fusion point of the polymer to coat the fibers. Alternatively, bare glass fibers can be mixed with the resin, and a solvent and this mixture extruded to apply the resin to the fibers. In all cases, however, a preferred result is obtained when the glass fibers are first coated with an organosilane monomer having a functional group thereon that is reactive with the polyolefin-organosilane polymer.

EXAMPLE 5

204 filament bare glass fibers are coated with the hot polymer produced as in Example 2 by pulling the fibers over a film of the resin as it exudes from an extruder at 500° F. The resin coating comprised approximately 50 percent by weight of the coated fibers. These fibers are brought together into a strand which is chopped into one quarter inch lengths as in Example 1. Fifty parts of these fibers were blended with 150 parts of the isotactic polypropylene of Example 2 and the mixture was then fed to an extruder at 500° F. The extruded material was chopped into one quarter inch pellets, and fed to an injection molding machine as in Example 1, and test specimens made therefrom had a tensile strength of 6,000 pounds per square inch.

By way of control, bare glass fibers of the above described type when mixed with the isotactic polypropylene in the ratio of 20/80 had a tensile strength of 3,500 pounds per square inch.

EXAMPLE 6

A 2,080 filament strand of glass fibers devoid of film formers was pulled through a dip tank containing a 5 percent xylene solution of the organosilane-polypropylene reaction product of Example 2. The xylene solution was at 280° F., and after removal of the strand from the dip tank it was oven dried at approximately 300° F. to evaporate the solvent. The strand was chopped into approximately one quarter inch lengths and 20 parts of the chopped fibers were blended with 80 parts of the isotactic polypropylene described in Example 2. The material was extruded and chopped into pellets, and was then injection molded into test specimens by the procedure described in Example 1. These test specimens had a tensile strength of 7,680 p.s.i.

By way of control, a 2,080 filament strand sized by drawing the strand through a polyvinyl acetate gamma aminopropyltriethoxy silane solution described in Example 1 was made. These fibers were chopped and were mixed with the isotactic polypropylene polymer in a 20/80 ratio in the same manner above described, and tensile bars formed from this material had a tensile strength of 5,200 pounds per square inch.

EXAMPLE 7

Fifty parts of the reaction product of Example 2 was dry blended with fifty parts of chopped one quarter inch long fibers of a 2,080 filament bare glass strand. The mixture was passed through an extruder at 500° F. and chopped into pellets. Fifty parts of these pellets were then dry blended with 150 parts of the isotactic polypropylene polymer described in Example 2 and the mixture was molded at 500° F. into a test specimen as above described. The test specimen had a tensile strength of 7,200 p.s.i.

The following Table I gives a list of other organosilanes which have been reacted with other thermoplastic resins. The table gives the temperature used to react the organosilane and polypropylene, and the percent of the silane used. The reaction products were applied to glass fibers in the manner given in Example 2 and the fibers were chopped and mixed with the same isotactic polypropylene resin given in Example 2 or another equivalent thermoplastic resin using the procedure of Example 2. The materials were molded into the test specimens as in Example 2, and the strength thereof is given in the table. Where blanks exist in Table I, the data is not available, but the materials exhibit the synergistic effect of the invention.

TABLE I

| Organosilane | Percent | Temp. (°C.) | P.S.I. strength |
|---|---|---|---|
| (1) $NH_2(CH_2)_3Si(OCH_2H_5)_3$ | 4.5 | 200 | 12,750 |
| (2) $NH_2(CH_2)_3Si(OCH_3)_3$ | 5.0 | 220 | 11,810 |
| (3) $(CH_3O)Si(CH_2)_3NH(CH_2)_2NH_2$ | 5.0 | 180 | 7,270 |
| (4) $CH_2=\overset{CH_3}{\underset{}{C}}-\overset{O}{\underset{}{C}}-O(CH_2)_3Si(OCH_3)_3$ | | | |
| (5) $Cl(CH_2)_3Si(OCH_3)_2$ | 4.8 | 180 | 6,970 |
| (6) $CH_2=CHSi(CH_3C_2H_4O)_3$ | 4.8 | 220 | 6,720 |
| (7) $HO(CH_2)_2NH(CH_2)_3Si(OC_2H_5)_3$ | | | |
| (8) $ClCH_2\overset{CH_3}{\underset{}{C}}HCH_2Si(OCH_3)_3$ | 5.0 | 50 | 6,480 |
| (9) $HO(CH_2)_3Si(OCH_3)_3$ | | | |
| (10) $CH_2=CHSi(Cl)_3$ | 5.0 | 200 | 5,012 |
| (11) $CH_2=CHSi(C_2H_5)_3$ | 5.0 | 200 | 5,050 |
| (12) $SiH_4$ | | | |
| (13) $Si_2H_6$ | | | |
| (14) $Si_3H_8$ | | | |
| (15) $H_3SiCl$ | | | |
| (16) $H_2SiCl_2$ | | | |
| (17) $HSiCl_3$ | | | |
| (18) $SiCl_4$ | | | |
| (19) $(CH_3)_4Si$ | | | |
| (20) $(CH_3)_2SiCl$ | | | |
| (21) $(CH_3)_2SiCl_2$ | | | |
| (22) $CH_3SiCl_3$ | | | |
| (23) $NH_2C_6H_4Si(OC_2H_5)_3$ | | | |
| (24) $CH_2=\overset{C_2H_5}{\underset{}{C}}COO(NH_2)_x(\overset{CH_3}{\underset{CH_3}{Si}-O})_y-CH_3$ | 5.0 | 200 | 6,262 |
| (25) $NH_2-(CH_2)_3(\overset{CH_3}{\underset{CH_3}{Si}})_x(OCH_3)_3$ | 5.0 | 200 | 7,268 |
| (26) $NH_2-(CH_2)_3(\overset{CH_3}{\underset{CH_3}{Si}-})(OC_2H_5)_3$ | 5.0 | 200 | 7,690 |
| (27) $NH_2-(CH_2)_3(\overset{C_6H_5}{\underset{C_6H_5}{Si}}-O-\overset{C_6H_5}{\underset{C_6H_5}{Si}}-OCH)-(OCH_3)_2$ | 5.0 | 200 | 6,775 |

In general, the reaction between the organosilane and the polyolefin is carried out at the highest temperature possible without producing a breakdown of the polyolefin or the silane. The breakdown temperature range will vary from 180° F. for the low molecular weight silanes to as high as 640° F. for high molecular weight silanes. The polyolefin will withstand this temperature range also provided the polyolefin does not contain an appreciable amount of low molecular weight materials and provided the polyolefin is not kept at the elevated temperature for an appreciable period of time during which breakdown of the polyolefin occurs. The reaction between the organosilane and the polyolefin occurs by reason of an addition to the remaining double bonds of the polyolefin, and to some extent to a cracking of the polyolefin to produce an unsaturate which then reacts with the organosilane. A free radical catalyst catalyzes the addition of the organosilane to the double bond portion of the polyolefin. Any free radical catalyst can be used. As for example, a diazo compound, a peroxide such as dicumyl peroxide, benzyl peroxide, t-butylperoxymalaic acid, ditertiarybutyl peroxide, or other free radical providing means such as radiation. All have been used with equal effectiveness. The polymeric reaction product of the organosilane and polyolefin may be formed using from 49 to 99 percent of the polyolefin, from 0.5 to 49 percent of the silane and from 0.1 to 5 percent of the catalyst. The polymeric reaction product is an effective coupling agent for glass fibers when the coating comprises from approximately 0.5 to 75 percent of the coated fibers, and is an effective aid in strengthening glass fiber filled polyolefins when the polyolefinic molding resin in which the fibers are dispersed contains from approximately 1.0 to 20 percent by weight of the polymeric reaction product distributed evenly throughout the polyolefin resin.

The polyolefins which serve as a backbone for the polymeric reaction products of the present invention have carbon to carbon unsaturated groups adjacent each end of the molecule of the polyolefin. The polymeric reaction product, therefore, can be represented by the following formula:

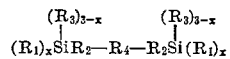

wherein: $R_1$ equals a hydrolyzable group attached to the silicon atom, $R_2$ equals a divalent organo radical having a carbon chain of at least 3 carbon atoms; $R_3$ equals a monovalent hydrogen, halogen, lower alkyl, alkoxy, phenoxy, or aryl radical, $R_4$ equals a divalent polyolefin radical having a molecular weight of from approximately 1,500 to approximately 50,000, and $x$ equals an integer from 1 to 3.

The organosilanes designated 24–27 of Table 1 are produced by the Owens-Corning Fiberglas Corporation under the designations polymer A, polymer C, polymer J, and polymer P, respectively, and are believed to have the general form given in the Table I.

EXAMPLE 8

The procedure of Example 4 was repeated excepting that gamma glycidoxypropyltrimethoxy silane was substituted for the gamma aminopropyltrimethoxy silane used in the polyvinyl solution that was applied directly to the fibers as a size. Test samples produced using the fiber size of the present example had a tensile strength of 11,870 p.s.i.

EXAMPLE 9

The process of Example 4 was repeated excepting that no organosilane was used with the polyvinyl acetate size material applied to the fibers, although the polymer was used as a strengthening agent of the thermoplastic resin. The test samples produced in accordance with this example had a tensile strength of 6,870 p.s.i.

EXAMPLE 10

Various organosilanes having amino, chloro, carbon to carbon unsaturate, hydroxy, glycidoxy, and other functional groups, have been used as a size to previously uncoated fibers in place of the organosilane polyvinyl acetate mixture of Example 4. Glass fibers coated only with the organosilane monomers of this example when processed according to the procedure of Example 4 gave test specimens having a tensile strength ranging from 8,390 p.s.i. to 10,900 p.s.i. In general, greatly increased strengths are had when both an organosilane monomer is applied directly to the fibers, and an organosilane-polyolefin copolymer is mixed with the thermoplastic impregnating resin. The materials whose fibers were coated only with the monomer are believed to have a slightly lower tensile strength than those coated with the mixture of the monomer and thermoplastic, because the organosilane monomer itself does not prevent abrasion of the fibers.

It will be apparent that there has been provided a new and improved method of increasing the strength of glass fiber filled-thermoplastic resins, as well as new and improved glass fiber-resin mixtures, and coupling agents for glass.

While the invention has been described in considerable detail, we do not wish to be limited to the particular embodiments described, and it is our intention to cover hereby all novel adaptations, modifications, and arrangements thereof which come within the practice of those skilled in the art to which the invention relates.

We claim:

1. The method of producing a polyolefin-organosilane graft copolymer comprising: heating an organic solution of from 49 to 99 parts by weight of a polyolefin having a molecular weight more than 500 but less than approximately 50,000 and having terminal double bonds adjacent the ends of the molecule to an elevated temperature at which unsaturated carbon to carbon bonds of the polyolefin will polymerize when catalyzed, preparing an organic solution of a mixture of a free radical catalyst and from 0.5 to 49 parts by weight of an organosilane having a functional group that is reactive with a carbon to carbon double bond, blending said second mentioned solution while it is at substantially room temperature into the first mentioned solution while it is at said elevated reactive temperature to couple the organosilane to said terminal double bonds of the polyolefin, and cooling said blend generally immediately after said materials are blended together.

2. An impregnating resin for bonding glass fibers and other surfaces, said resin comprising: from approximately 80 to approximately 99 percent by weight of a normally solid molding grade thermoplastic polyolefin resin, admixed with from approximately 1 to approximately 20 percent by weight of a polyolefin having a molecular weight of more than 500 but less than approximately 50,000 and having a silane attached at the sites of terminal carbon to carbon double bonds of the polyolefin.

3. The impregnating resin of claim 2 wherein the polyolefin having a silane attached is the reaction product of a polypropylene and an aminosilane.

4. A molding compound comprising: from approximately 2 to approximately 50 percent by weight of glass fibers less than approximately ½ inch long, and from approximately 50 to approximately 98 percent by weight of the impregnating resin of claim 3.

5. The molding compound of claim 4 wherein the glass fibers are coated with an organosilane coupling agent that is reactive with the organosilane-polyolefin reaction product.

6. A polymeric material useful as a bonding agent between glass and other surfaces, said polymeric material consisting essentially of:

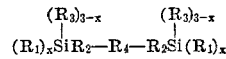

wherein: $R_1$ is an alkoxy radical, $R_2$ is a gamma aminopropyldivalent radical, $R_3$ equals a monovalent hydrogen, halogen, lower alkyl, alkoxy, phenoxy, or aryl radical, $R_4$ equals a divalent polyolefin radical having a molecular weight of from approximately 500 to approximately 50,000, and $x$ is 3.

7. The polymeric material of claim 6 wherein $R_4$ has a moleucular weight of approximately 2,000.

8. The polymeric material of claim 6 wherein $R_4$ is a polypropylene radical.

9. A polymeric useful as a bonding agent between glass and other surfaces, said polymeric material consisting essentially of:

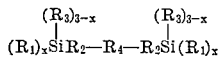

wherein: $R_1$ equals a hydrolyzable group attached to the silicon atom, $R_2$ equals a divalent organo radical containing amine nitrogen and having a carbon chain of at least 3 carbon atoms, $R_3$ equals a monovalent hydrogen, halogen, lower alkyl, alkoxy, phenoxy, or aryl radical, $R_4$ equals a divalent polyolefin radical having a molecular weight of approximately 2,000 and $x$ equals an integer from 1 to 3.

10. Glass fibers coated with a polymeric material consisting essentially of:

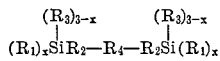

wherein: $R_1$ equals a hydrolyzable group attached to the silicon atom, $R_2$ equals a divalent organo radical having a carbon chain of at least 3 carbon atoms; $R_3$ equals a monovalent hydrogen, halogen, lower alkyl, alkoxy, phenoxy, or aryl radical, $R_4$ equals a divalent polyolefin radical having a molecular weight of from approximately 500 to approximately 50,000, and $x$ equals an integer from 1 to 3.

References Cited

UNITED STATES PATENTS

| | | | |
|---|---|---|---|
| 3,225,018 | 12/1965 | Zutty | 260—46.5 |
| 3,290,267 | 12/1966 | Vanberbilt et al. | 260—878 |
| 3,013,915 | 12/1961 | Morgan | 260—46.5 |
| 3,075,948 | 1/1963 | Santelli | 260—827 |

FOREIGN PATENTS

| | | |
|---|---|---|
| 1,016,512 | 1/1966 | Great Britain. |
| 940,190 | 10/1963 | Great Britain. |

MORRIS LIEBMAN, Primary Examiner

L. T. JACOBS, Assistant Examiner

U.S. Cl. X.R.

117—126; 260—37, 827